Figure 1:
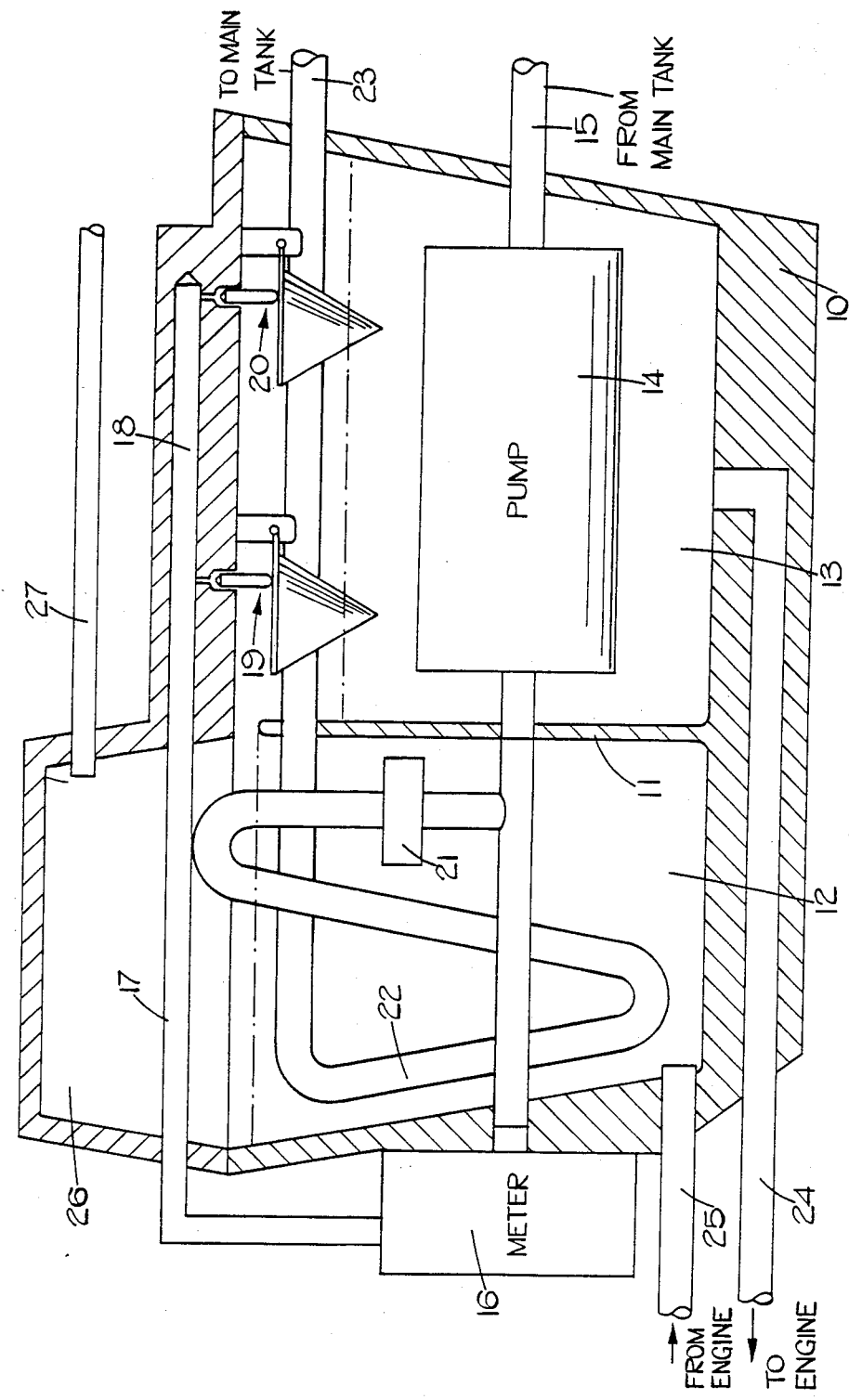

United States Patent [19]

Soltau

[11] Patent Number: 4,539,965
[45] Date of Patent: Sep. 10, 1985

[54] FUEL FLOW MEASURING SYSTEM FOR AN INTERNAL COMBUSTION ENGINE POWERED VEHICLE

[76] Inventor: John P. Soltau, 5 Lightwoods Close, Copt Heath, Knowle, Solihull, West Midlands B93 9LS, England

[21] Appl. No.: 597,084

[22] Filed: Apr. 5, 1984

[30] Foreign Application Priority Data

Apr. 8, 1983 [GB] United Kingdom ................. 8309612

[51] Int. Cl.³ ............................................. F02M 37/00
[52] U.S. Cl. .................................... 123/514; 123/557; 73/119 A
[58] Field of Search ............. 73/113, 119 A; 123/514, 123/516, 557

[56] References Cited

U.S. PATENT DOCUMENTS 2,599,699 6/1952 Dilworth et al. .................... 123/514
3,973,536 8/1976 Zelders ................................. 73/113
4,175,527 11/1979 Sanada et al. ........................ 123/516
4,253,332 3/1981 Sabatino et al. ...................... 73/113

Primary Examiner—Ivars Cintins
Attorney, Agent, or Firm—Staas & Halsey

[57] ABSTRACT

A fuel flow measuring system includes a housing in which a pump is mounted. The housing is divided by a weir into two tank zones into one of which fuel returned by an engine fuel system is admitted and from the other of which fuel is drawn by the fuel system. The pump outlet is connected by a fuel flow measuring device to depth sensing means in said other tank zone to admit sufficient fuel to maintain the level in said other tank zone constant. Remaining fuel delivered by the pump is returned to a main storage tank via a pressure relief valve and a heat exchanger in series.

4 Claims, 3 Drawing Figures

FUEL FLOW MEASURING SYSTEM FOR AN INTERNAL COMBUSTION ENGINE POWERED VEHICLE

This invention relates to a flow measuring system for use in an internal combustion engine powered vehicle, but which is equally capable of being used in an engine test cell.

Many vehicle engine installations make use of a pump which draws fuel from a main fuel storage tank and delivers it to the engine. Generally excess fuel is drawn and this excess is returned to the main tank where it is mixed with the fuel in the main tank so as to prevent fuel being repeatedly recirculated and caused to heat up excessively and form vapour thereby. The measurement of fuel consumption in such systems is complicated by the return of excess fuel to the tank and whilst various measurement systems have been proposed, these are more suitable for laboratory use than long term test cell or fleet use. Moreover, in many proposed systems unacceptable pressure losses are incurred, which can significantly alter engine fuelling.

It is an object of the invention to provide a fuel flow measurement system which overcomes the problems raised by excess fuel return in a simple and expeditious manner.

A fuel flow measuring system in accordance with the invention comprises a housing in which there is mounted a constant flow electric fuel pump for drawing fuel from a main storage tank, a first tank zone in said housing to which excessive fuel delivered to the engine is returned in use, a second tank zone in said housing from which fuel is delivered to the engine, said tank zones being vented to atmosphere, means sensitive to the depth of fuel in said second tank zone for admitting fuel from the outlet of the pump via a flow measuring device to said second tank zone so as to maintain the volume of fuel in said second tank zone constant, a pressure relief valve and a heat exchange device connected in series between the pump outlet and a return pipe for returning fuel to the main tank, and means for allowing fuel to pass from said first tank zone to said second zone of said housing.

With a system as described above, since the level of fuel in said second tank zone is maintained constant by fuel pumped thereto by the pump and said second tank zone is vented, the measuring system does not introduce any unacceptable pressure losses into the engine fueling system.

Figure 2:
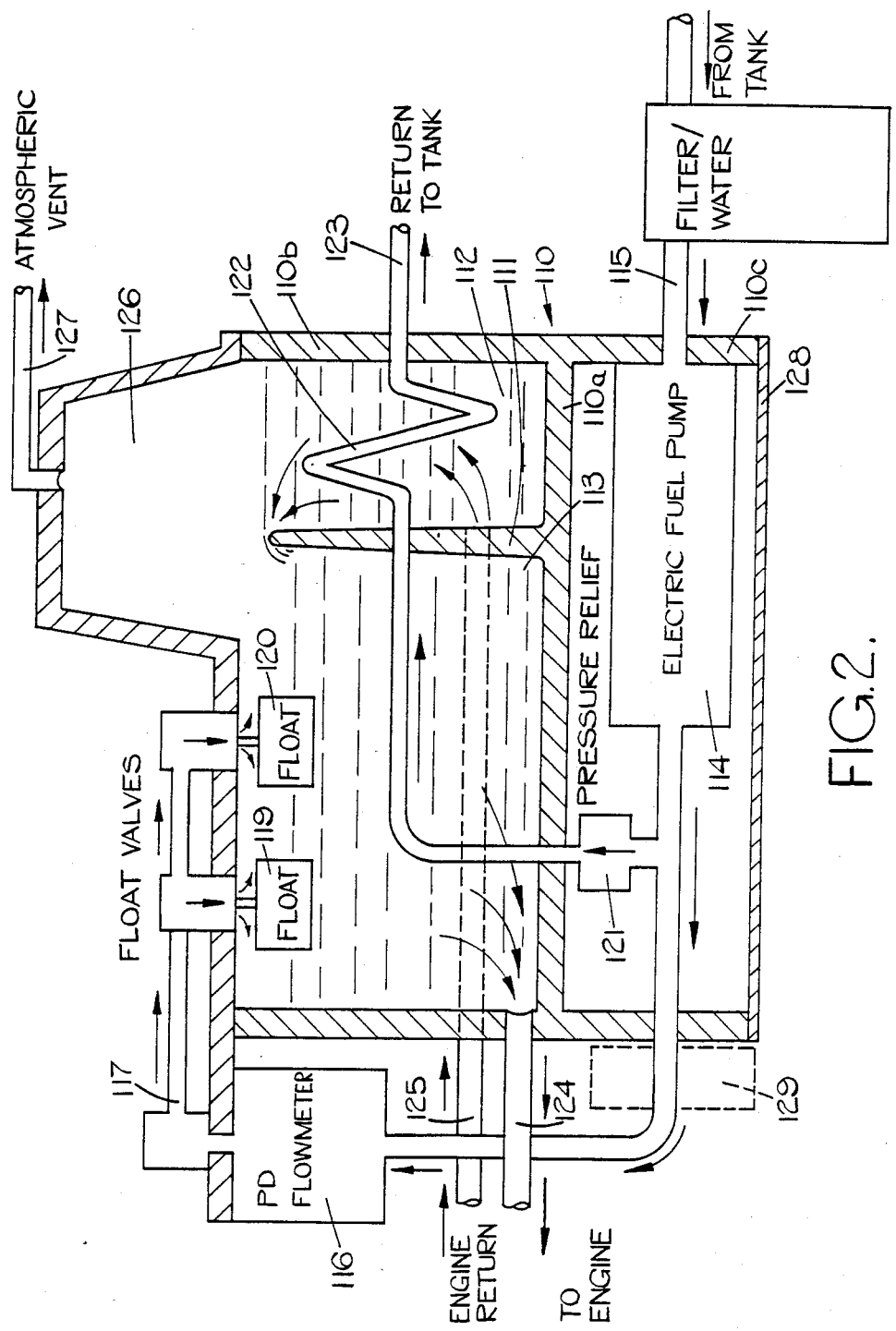
Figure 3:
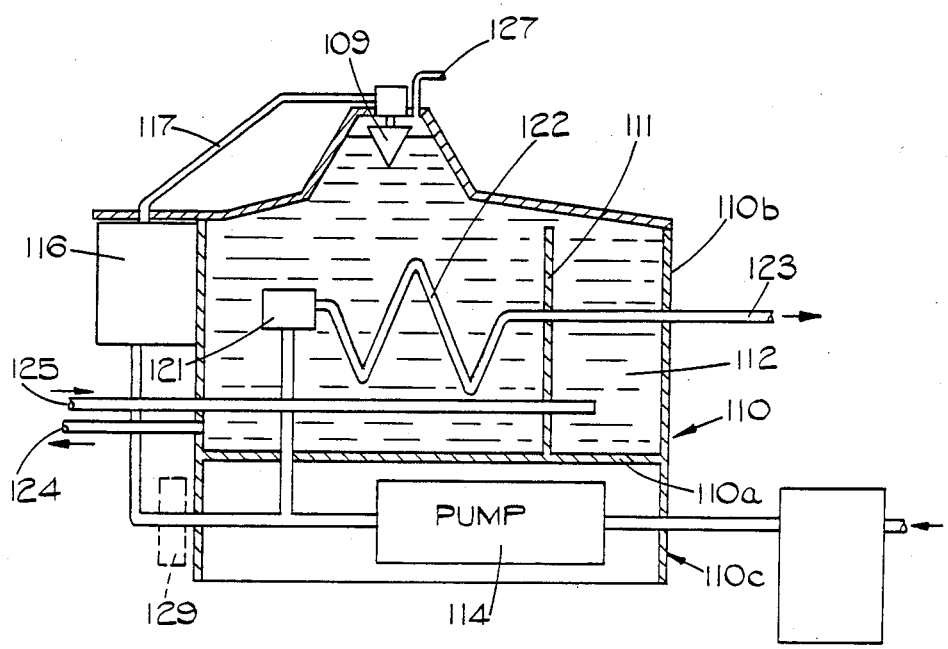

An example of the invention is shown in the accompanying drawing in which FIGS. 1 to 3 are similar sectional views of three embodiments of measuring system in accordance with the invention.

In the embodiment shown in FIG. 1, the system comprises a housing in the form of an auxiliary tank 10, which is divided internally by a weir 11 into first and second zones 12, 13. An electric fuel pump 14 is immersed in the zone 13 of the tank and has its inlet connected to an inlet pipe 15 through which it draws fuel from a main fuel tank (not shown). The outlet of the pump 14 is connected to a positive displacement type fuel flow meter 16, the outlet of which is connected via a pipe 17 to a passage 18 in the lid of the auxiliary tank overlying the zone 13 thereof. One or more float operated valves 19, 20, sensitive to the level of fuel in the zone 13 control escape of fuel from passage 18 into zone 13 of the auxiliary tank.

The outlet of the pump 14 is also connected via a pressure relief valve 21 and a heat exchange device 22 immersed in the fuel in zone 12 to a return pipe 23 which carries fuel back to the main tank. The auxiliary tank has an outlet pipe 24 from the zone 13 through which fuel can flow from the auxiliary tank to the engine, and an inlet pipe 25 to the zone 12 for fuel which is returned from the engine fuel system.

The auxiliary tank is sealed, but an air/vapour space 26 in the lid is connected by a vent pipe 27 to an air space in the main tank which is itself vented to atmosphere.

In use fuel drawn by pump 14 from the main tank passes through the meter 16, which records flow accurately, and into the zone 13 via the float controlled valves 19 and 20, whence fuel flows out to the engine. Fuel returned from the engine flows into zone 12 and spills over the weir 11 into zone 13. When fuel is returning from the engine in this way the float valves 19, 20 will cause the pressure at the pump outlet to rise until valve 21 opens allowing pumped fuel to return to the main tank. Such returning fuel extracts heat from fuel in the zone 12 and returns such heat to the main tank where it is dissipated. The exterior of the housing preferably has heat dissipating fins.

In the example shown in FIG. 2, the housing 110 is again shaped to provide tank zones 112 and 113 separated by a weir 111, but in this case, the pump 114 is not immersed in the fuel, but is housed in a dry cavity in the housing beneath the two tank zones 112, 113. Thus, as shown, the housing has a base wall 110a on which there is an upstanding tank wall 110b and a depending skirt wall 110c defining this dry cavity. A cover 128 is provided for closure of the cavity.

The two systems shown are suitable for use with diesel fuel. For petrol, however, a de-aerator may be required. FIG. 2 shows a suitable position for fitting a de-aerator 129 of known form at the inlet to the flowmeter 116.

Although both the examples described and shown have the heat exchanger 22, 122 located in the returned fual zone 12, 112, it will be understood that it may be in the other zone 13, 113 or split bvetween the two zones. Furthermore, although the relief valve 21, 121 is shown at the pump outlet, it may alternatively be located on the exterior of the housing connected in the connecting pipe 123 which carries excess fuel back to the main fuel storage tank.

The example shown in FIG. 3 is similar to that shown in FIG. 2 and uses the same reference numerals. In this case, however, the float valve 119 is mounted high in the part of the lid of the housing which forms the space 126 in FIG. 2. Thus the fuel fills the housing almost completely, leaving a very small vapour space. The shape of the lid is such that the surface area of liquid in the housing is minimised. This makes the apparatus more useful in situations where the vehicle to which it is fitted is likely to undergo rapid changes of altitude.

It will be noted that the wall 111 no longer acts as a weir, but, being totally submerged, acts as a baffle.

In systems in which there is little or no air or vapour in the return fuel the wall 111 could be dispensed with. Furthermore, in other applications where returned fuel contains a large concentration of air, stainless steel wool can be installed in the zone 112 to assist in bubble agglomeration.

I claim:

1. A fuel flow measuring system comprising a housing in which there is mounted a constant flow electric fuel pump for drawing fuel from a main storage tank, a first tank zone in said housing to which excessive fuel delivered to the engine is returned in use, a second tank zone in said housing from which fuel is delivered to the engine, said second tank zone being vented to atmosphere, means sensitive to the depth of fuel in said second tank zone for admitting fuel from the outlet of the pump via a flow measuring device to said second tank zone so as to maintain the volume of fuel in said second tank zone constant, a pressure relief valve and a heat exchange device connected in series between the pump outlet and a return pipe for returning fuel to the main tank, and means for allowing fuel to pass from said first tank zone to said second zone of said housing.

2. A system as claimed in claim 1 in which said first and second tank zones are separated by a weir over which fuel can escape from the first tank zone to the second tank zone, said depth sensitive means acting to prevent fuel from the pump outlet being admitted to said second tank zone when the depth of fuel therein is greater than a predetermined maximum, which is lower than said weir.

3. A system as claimed in claim 2 in which said depth sensitive means comprises at least one float operated valve.

4. A system as claimed in any one preceding claim in which the exterior of the housing is provided with heat dissipating fins.

* * * * *